United States Patent [19]

Sweet et al.

[11] 4,210,358
[45] Jul. 1, 1980

[54] CLOSURE PANEL ACTUATOR

[75] Inventors: Philip J. Sweet; Buck C. Hamlet; David L. Sweet, all of Fresno, Calif.

[73] Assignee: American Carrier Equipment, Inc., Fresno, Calif.

[21] Appl. No.: 951,623

[22] Filed: Oct. 16, 1978

[51] Int. Cl.$^2$ ............................................. B60P 7/02
[52] U.S. Cl. ................................. 296/100; 296/210; 220/1 T; 220/211
[58] Field of Search .......... 296/183, 100, 101, 137 A, 296/137 B, 173, 137 R, 99 R, 98; 49/327, 328; 105/288, 293; 214/54; 220/1.5, 1 T, 211, 1 V, 259

[56] References Cited

U.S. PATENT DOCUMENTS

| 316,536 | 4/1885 | Gage | 296/101 X |
| 2,166,846 | 7/1939 | McCalley | 296/101 X |
| 3,292,971 | 12/1966 | Zucker | 296/100 X |
| 3,861,737 | 1/1975 | Kirkbride | 296/100 |
| 4,083,596 | 4/1978 | Robertson | 296/100 |

Primary Examiner—John J. Love
Assistant Examiner—Norman L. Stack
Attorney, Agent, or Firm—Huebner & Worrel

[57] ABSTRACT

In combination with a pair of pivotal closure panels provided for opening and closing the opening of an open-top cargo box, an actuator including a boss affixed to and projected from each panel of the pair, a pair of actuator arms, each being characterized by an elongated body supported at one end for pivotal displacement along a path intercepted by a boss projected from an associated panel; a shaft supporting each arm of the pair, and a chain-driven sprocket mounted on the shaft for imparting angular displacement to the shaft, whereby the arm is caused to engage the boss intercepting the path thereof and force the associated panel in pivotal displacement.

8 Claims, 4 Drawing Figures

CLOSURE PANEL ACTUATOR

BACKGROUND OF THE INVENTION

1. Field of the Invention

The invention generally relates to actuators for closure panels and more particularly to actuators for pivotal closure panels mounted on open-top vehicles, such as rubbish trailers and the like.

2. Description of the Prior Art

The use of open-top cargo boxes for rubbish trailers and the like is well known. For example, see U.S. Letters Pat. No. 4,068,769 which issued Jan. 17, 1978. Of course, such cargo boxes usually are provided with closure panels which serve to prevent rubbish and the like from being discharged inadvertently from the open-top thereof as the cargo box is transported down streets, highways and the like.

As disclosed in the aforementioned United States Letters Patent, closure panels pivotally supported for displacement about a pair of axes are extended in parallelism along the opposite sides of the open-top cargo box. While the panels serve quite satisfactorily for their intended purpose, it is important to note that opening and closing of the panel usually requires that an operator, or his assistant, employ a long, pole-like member for displacing the panels between their open and closed positions, relative to the open-top of the cargo box. Such procedures are, in some instances, dangerous to perform, and usually are cumbersome, time consuming and generally tend to impair high speed operations. In view of additional operational costs resulting from less time, it can be appreciated that there exists a need for a device having a capability for rapidly opening and closing the opening for an open-top refuse vehicle.

It is, therefore, the general purpose of the instant invention to provide an actuator for the closure panels for an open-top cargo box which overcomes the disadvantages and difficulties aforementioned.

OBJECTS AND SUMMARY OF THE INVENTION

It is an object of the invention to provide an actuator for closure panels.

It is another object to provide in combination with the closure panel supported for pivotal displacement in juxtaposition with an opening, a closure panel actuator for pivotally displacing the panel.

It is another object to provide in combination with a pair of closure panels provided for closing the opening of an open-top cargo box, an actuator including a pair of arms supported for pivotal displacement into engaging relation with the panels.

Another object is to provide an actuator for displacing pivotal closure panels which is particularly suited for use in connection with closure panels provided for open-top cargo boxes, although not necessarily restricted in use thereto since the actuator may be employed in connection with the operation of pivotal closure panels provided for openings other than those provided for open-top vehicles.

These together with other objects and advantages are achieved through a use of a boss projected from each of a pair of pivotally supported panels, in parallelism with pivotal axis thereof, a pair of arms supported for pivotal displacement about axes paralleling said pivotal axes along paths intercepted by the bosses, and at least one motor for driving the arms in pivotal displacement, as will become more apparent by reference to the following description and claims in light of the accompanying drawings.

DESCRIPTION OF THE PREFERRED EMBODIMENT

Figure 1:
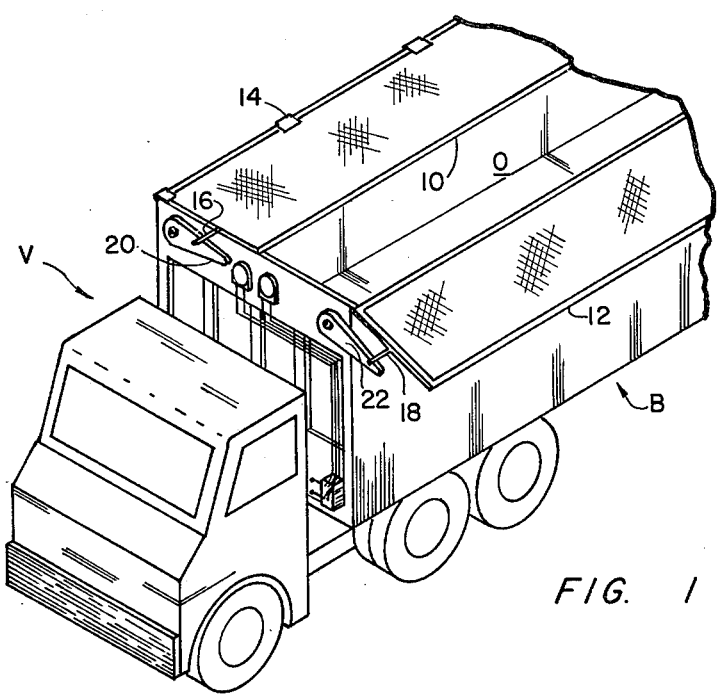
FIG. 1 is a fragmented, perspective view of an open-top cargo box equipped with a pair of pivotal closure panels supported to be manipulated by an actuator embodying the principles of the instant invention.

Referring now with more particularity to the drawings wherein like reference characters designate like or corresponding parts throughout the several views, there is shown in FIG. 1 a rubbish vehicle, generally designated V, including an open-top cargo box, designated B, equipped with a pair of closure panels 10 and 12.

The closure panels 10 and 12, as shown, are supported for pivotal displacement about a pair of parallel axes, not designated, extended along opposite sides of an opening, designated O. In practice, the opening O is employed in filling the box B and the panels 10 and 12 are pivotally connected to the box by hinges 14 which facilitate pivotal displacement of the panels between open and closed positions, relative to the opening O.

Mounted on the panels 10 and 12 are bosses, designated 16 and 18, respectively. The bosses 16 and 18 comprise projections extended in parallelism with the axes about which the panels 10 and 12 are supported for pivotal displacement. As shown, each boss comprises a cylindrical member welded or otherwise rigidly affixed to the forward or leading surface of the panel from which it is projected.

Mounted on the box B, at the forward transverse wall thereof, not designated, there is a pair of actuator arms, designated 20 and 22. Since the arms 20 and 22 are structurally similar, fabricated in a similar manner, and perform a similar function, a detailed description of a single arm is deemed adequate to provide for a complete understanding of the instant invention.

Figure 3:
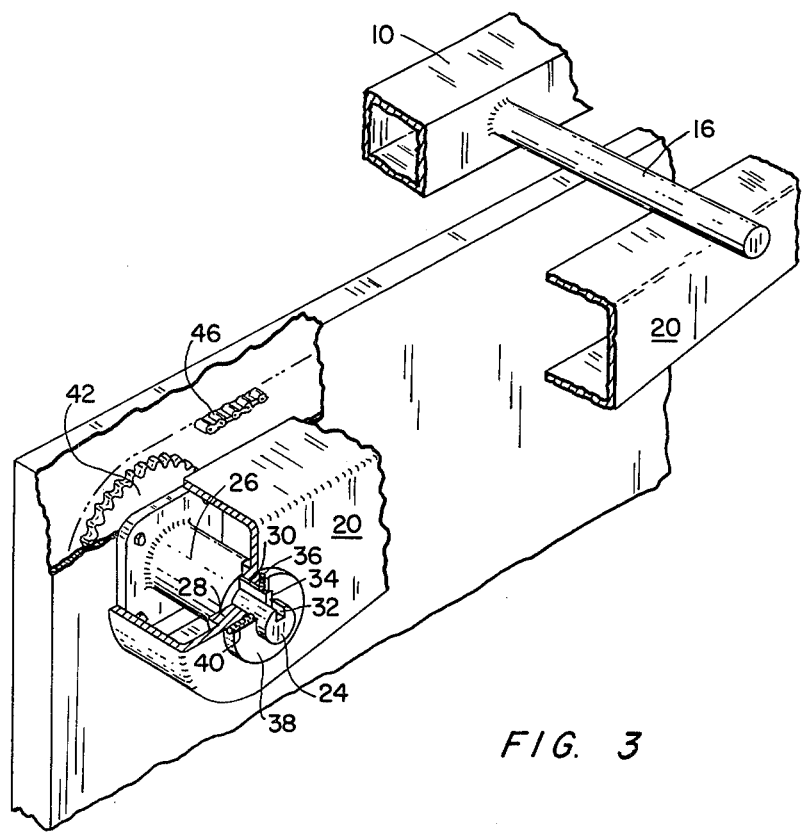
FIG. 3 is a fragmented perspective view of one of the actuators shown in FIG. 1.

With particular reference to FIG. 3, wherein is fragmentally illustrated the arm 20, it can be seen that the arm 20 is mounted at an extended end of a shaft 24. This shaft is supported by a bearing block 26 including a bore extended therethrough. As shown, the arm 20 includes a bearing collar 28, welded or otherwise rigidly affixed to the arm, having defined therein a key-way 30 disposed in opposed relation with a key-way 32 formed in the shaft 24. A key 34 is seated in the key-ways 30 and 32, and is secured in place by suitable means. Where desired, a set screw 36 radially extended through an annular projection 38 of the collar 28 is employed. Additionally, the projection 38 is provided with a further set screw 40 extended radially through the projection 38 into engaging relation with the shaft 24. However, where so desired, fasteners such as cotter pins, snap rings and the like readily can be employed for the purpose of joining the arm with the shaft 24.

It is important to note that the bearing block 26 is bolted or otherwise affixed to the front wall of the cargo box while the shaft 24 extends through the bore formed therein. Thus the shaft is supported by the cargo box.

Figure 2:
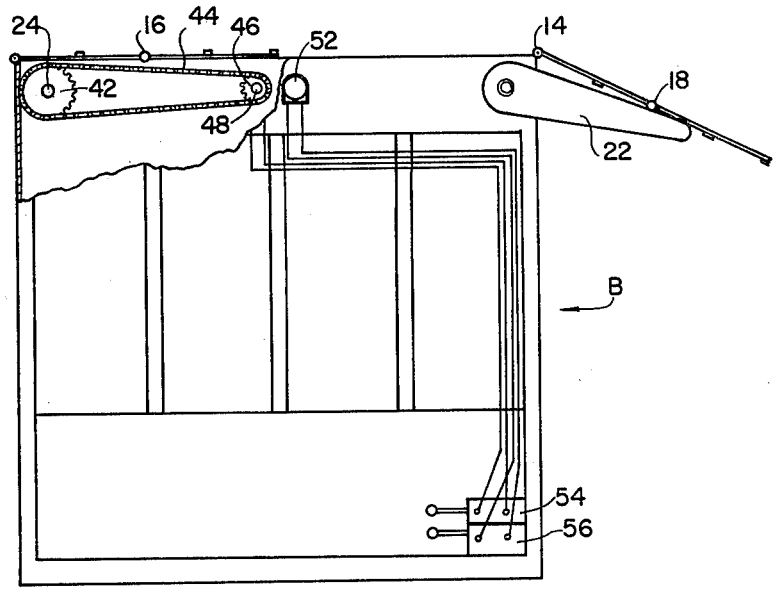
FIG. 2 is a fragmented end elevational view of the cargo box shown in FIG. 1.

At the end of the shaft 24, opposite the key-way 32 there is mounted a sprocket 42. The specific manner in which the sprocket 42 is mounted on and affixed to the shaft 24 is varied as desired. It is to be understood that the sprocket 42 is disposed in an external enclosure located at the uppermost portion of the front wall, aforementioned. The sprocket serves to impart angular displacement to the shaft 24 for driving the arm 20 in pivotal displacement about the shaft's longitudinal axis. In practice, the sprocket 42 is driven by an endless chain 44 passed about the periphery of the sprocket and meshed with the teeth thereof. The chain 44 also is trained about a driven sprocket 46, FIG. 2, mounted on a drive shaft 48, in fixed relation therewith. The drive shaft 48, in turn, comprises the output shaft of one of a pair of hydraulic motors designated 50 and 52 also affixed to the front or leading wall of the box B. The hydraulic motors 50 and 52 preferably comprise low-speed, high-torque, reversible motors sold under the registered trademark Char-lynn, and are obtainable from Safe Guard Industries, Aberdeen, South Dakota.

Figure 4:
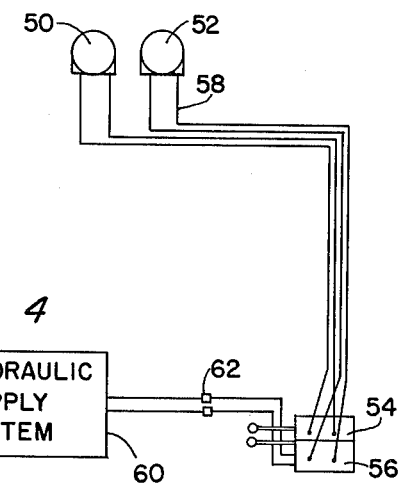
FIG. 4 is a diagrammatic view illustrating an hydraulic system provided for controlling the operation of the actuator.

As shown in FIG. 4, the motors 50 and 52 are connected to first and second manually operable valves 54 and 56, respectively. Suitable hydraulic lines 58 are provided for connecting the motors in direct communication with the valves in a manner well understood by those familiar with hydraulic systems. It is to be understood that each of the motors 50 and 52 is operable independently of the other, and that the valves 54 and 56 serve to control operation of the motors in a well known manner.

Additionally, it is to be understood that the valves 54 and 56 are connected with a hydraulic supply system, designated 60, through quick disconnects 62, of a type frequently found aboard trucks, tractors and the like. Since the details of the system 60 form no specific part of the instant invention, a detailed description thereof is omitted. It suffices to understand that the system 60 is of known design and functions simply to drive the motors 50 and 52.

OPERATION

It is believed that in view of the foregoing description, the operation of the device will readily be understood, however, it will be reviewed at this point in the interest of completeness.

With the arms 20 and their associated drive mechanism including the motors 50 and 52 mounted on the forward wall of a selected cargo box, and the bosses 16 and 18 rigidly affixed to the panels 10 and 12, as illustrated in the drawings, the system is prepared for operation simply by connecting the valves 54 and 56 to a hydraulic supply system 60, at the couplings 62.

It will be appreciated, of course, that in order to open the cargo box at the top thereof, for thus accommodating access to the interior thereof through the opening O, it is necessary that the panels 10 and 12 be pivotally displaced upwardly and outwardly from the opening. This is achieved by manually manipulating the valves 54 and 56 for activating the motors 50 and 52 in a manner such that the arms 20 and 22 are driven in opposite directions for thus causing the upper surfaces of the arms, not designated, to engage the surfaces of the bosses 16 and 18 for lifting the panels 10 and 12 as continued pivotal displacement is imparted to the arms 20 and 22. Of course, the bosses simply slide along the surfaces of the arms until the panels are in an overcenter position which permits the panels to gravitate outwardly and downwardly. Thus, the opening O is exposed for filing.

Once the cargo box B is filled the opening O is closed by again activating the motors 50 and 52 in reverse manners. For example, the motor 50 is energized in a manner such that the arm 20 sweeps in a clockwise direction for engaging the boss 16. Continued pivotal displacement of the arm 20 causes the arm to lift the panel 10 upwardly and inwardly until the panel is in a position to gravitate into closing relation with the opening O. Similarly, the motor 52 is activated, through a manipulation of the valve 56, for causing the arm 22 to sweep in a counter-clockwise direction for engaging the boss 18. Continued pivotal displacement of the arm 22 causes the panel 12 to be lifted upwardly and inwardly until it is disposed in a position to fall into a closing disposition relative to the opening O.

It should now be apparent that through the use of the actuator of the instant invention the opening and closing of the panel opening O for the box B of vehicle V is greatly simplified.

Although the invention has been herein shown and described in what is conceived to be the most practical and preferred embodiment, it is recognized that departures may be made therefrom within the scope of the invention, which is not to be limited to the illustrative details disclosed.

Having described our invention, what we claim as new and desire to secure by Letters Patent is:

1. In combination with a closure panel adjacently related to an opening and supported for pivotal displacement between open and closed dispositions relative to said opening and about a first pivotal axis arranged in juxtaposition with the opening, the improvement comprising:

A. means for pivotally displacing said panel including a boss projected from the panel and supported thereby in parallelism with the first axis, and means for displacing said boss along an arcuate path whereby said panel is pivotally displaced about said first axis between its open and closed dispositions including an arm supported for pivotal displacement about a second pivotal axis paralleling said first pivotal axis and along a path intercepted by said boss for displacing said boss along said arcuate path and having a bearing surface extended along opposite side edge surfaces thereof for supporting the boss in sliding contact, whereby a sliding advancement of the boss along the arm is accommodated as said panel is pivotally displaced between its open and closed dispositions in response to displacement of the boss along said arcuate path as pivotal displacement is imparted to the arm; and B. means for imparting to said arm pivotal displacement.

2. The improvement of claim 1 wherein said opening is defined in a cargo box, said closure panel is mounted on said box and said means for imparting to said arm pivotal displacement includes means for selectively displacing said arm in opposite directions.

3. The improvement of claim 1 wherein said opening is defined in the top of said box and each of the pivotal axes is disposed in a substantially horizontally oriented plane.

4. The improvement of claim 3 wherein said first pivotal axis is extended along one top edge of said box, said closure panel comprises one of a pair of similar closure panels, and said arm comprises one of a pair of similar arms.

5. In combination with a pair of closure panels provided for closing the opening of an open-top cargo box and supported for pivotal displacement about a pair of axes extended in parallelism along opposite side edges of said opening;
  A. a pair of bosses, each boss of the pair being affixed to and projected from one panel of said pair of panels in parallelism with said axes; and
  B. means for pivotally displacing said panels in opening and closing directions relative to the opening of said cargo box including,
  (1) a pair of actuator arms, each arm of said pair of arms being characterized by an elongated body supported at one end for pivotal displacement about an axis extended in parallelism with said pair of axes and along a path intercepted by one boss of said pair for engaging and displacing the boss along an arcuate path, whereby said panel responsively is pivotally displaced, and
  (2) means defining on opposite sides of each of said arms a bearing surface for supporting in sliding contact one boss of said pair of bosses, whereby a sliding advancement of the boss along the arm is accommodated as displacement is imparted to said boss for pivotally displacing said one panel; and
  (3) drive means for pivotally displacing each of said pair of arms in pivotal displacement.

6. The actuator of claim 5 wherein said drive means includes a shaft connected in supporting relation with each arm of said pair, a first sprocket mounted on the shaft, an endless chain trained about the sprocket, and means including a motordriven second sprocket connected to the chain for selectively advancing the chain about the first sprocket, whereby angular displacement is imparted to the shaft for pivotally displacing the arm connected therewith.

7. The actuator of claim 6 wherein said second sprocket is mounted to be driven in bi-directional rotation and said drive means includes a reversible hydraulic motor connected to said second sprocket in driving relation therewith.

8. The actuator of claim 6 wherein said cargo box comprises a trailer for hauling refuse adapted to be filled from the opening, said pivotal axes are extended in parallelism with the longitudinal axis of symmetry for the trailer, said arms are mounted at the leading end of the trailer relative to its intended direction of travel, and said arms are supported for pivotal displacement in a common plane normally related to the horizontal axis of symmetry for said trailer.

* * * * *